(12) United States Patent
Lee et al.

(10) Patent No.: US 11,205,801 B2
(45) Date of Patent: Dec. 21, 2021

(54) LITHIUM SECONDARY BATTERY

(71) Applicants: Hyundai Motor Company, Seoul (KR); Kia Motors Corporation, Seoul (KR)

(72) Inventors: Yoon Sung Lee, Gyeonggi-do (KR); Sangjin Park, Gyeonggi-do (KR); Shinkook Kong, Gyeonggi-do (KR); Jung Young Cho, Seoul (KR); Dongjun Kim, Gyeonggi-do (KR); Ikkyu Kim, Gyeonggi-do (KR); Yeolmae Yeo, Gyeonggi-do (KR); Jieun Lee, Gyeonggi-do (KR); Sang Mok Park, Gyeonggi-do (KR); SungHoon Lim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 316 days.

(21) Appl. No.: 16/573,368

(22) Filed: Sep. 17, 2019

(65) Prior Publication Data
US 2020/0313235 A1  Oct. 1, 2020

(30) Foreign Application Priority Data
Mar. 28, 2019 (KR) .................. 10-2019-0035694

(51) Int. Cl.
| | | |
|---|---|---|
| H01M 10/0567 | (2010.01) | |
| H01M 4/131 | (2010.01) | |
| H01M 4/133 | (2010.01) | |
| H01M 4/134 | (2010.01) | |
| H01M 4/36 | (2006.01) | |
| H01M 4/505 | (2010.01) | |
| H01M 4/525 | (2010.01) | |
| H01M 4/587 | (2010.01) | |
| H01M 10/0525 | (2010.01) | |
| H01M 4/38 | (2006.01) | |

(52) U.S. Cl.
CPC ....... *H01M 10/0567* (2013.01); *H01M 4/131* (2013.01); *H01M 4/133* (2013.01); *H01M 4/134* (2013.01); *H01M 4/364* (2013.01); *H01M 4/386* (2013.01); *H01M 4/505* (2013.01); *H01M 4/525* (2013.01); *H01M 4/587* (2013.01); *H01M 10/0525* (2013.01); *H01M 2220/20* (2013.01); *H01M 2300/004* (2013.01)

(58) Field of Classification Search
CPC .. H01M 10/0567; H01M 4/131; H01M 4/133; H01M 4/134; H01M 4/364; H01M 4/505; H01M 4/525; H01M 4/587; H01M 10/0525; H01M 4/386; H01M 2220/20; H01M 2300/004; H01M 2300/0025; H01M 10/4235; H01M 10/52; H01M 10/052; Y02E 60/10
See application file for complete search history.

(56) References Cited

U.S. PATENT DOCUMENTS

2015/0044551 A1*  2/2015  Taki .................. H01M 4/38
                                                        429/188

* cited by examiner

*Primary Examiner* — Cynthia K Walls
(74) *Attorney, Agent, or Firm* — Mintz Levin Cohn Ferris Glovsky and Popeo, P.C.; Peter F. Corless

(57) ABSTRACT

Disclosed is a lithium secondary battery having an improved lifetime. The lithium secondary battery may include: a cathode including a cathode active material; an anode including an anode active material; a separator disposed between the cathode and the anode; and an electrolyte including bis(trimethylsilyl) 2,2-thiodiacetate.

14 Claims, 3 Drawing Sheets

LITHIUM SECONDARY BATTERY

CROSS-REFERENCE TO RELATED APPLICATION

This application is based on and claims priority under 35 U.S.C. § 119 to Korean Patent Application No. 10-2019-0035694, filed on Mar. 28, 2019, in the Korean Intellectual Property Office, the invention of which is incorporated by reference herein in its entirety.

TECHNICAL FIELD

The present invention relates to an electrolyte for a lithium secondary battery, and more particularly, to an electrolyte composition for medium- and large-size lithium secondary batteries with improved lifetime characteristics, and a lithium secondary battery including the electrolyte composition.

BACKGROUND

In general, a lithium secondary battery has a high operating voltage and high energy density since it contains an electro-active material, compared to a lead battery or a nickel/cadmium battery. Accordingly, lithium secondary batteries have been widely used as energy storage means for energy storage systems (ESS) as well as vehicles such as electric vehicles (EV) and hybrid electric vehicles (HEV).

Generally, a lithium secondary battery includes a cathode, an anode, a separator disposed between the electrodes, and an electrolyte. The electrolyte used is prepared by dissolving an appropriate amount of lithium salt in an organic solvent. In particular, lithium secondary batteries mounted on electric vehicles have been developed in accordance with environments and use characteristics of various vehicles.

In the currently used electrolytes for lithium secondary batteries, various side reactions occur due to repeated charging and discharging. By-products generated by such side reactions are becoming one of the factors that degrade the performance of the batteries. Particularly, when $LiPF_6$ lithium salt is contained in the electrolyte, a dissolution of the cathode is caused by destruction of a solid electrolyte Interface (SEI) coating on the surface of the anode, which can be a serious obstacle to battery operation.

In order to improve the mileage of an electric vehicle, densification of battery energy is the most important. For the densification of battery energy, it is necessary to optimize the composition of the electrolyte due to side reactions between the electrolyte and a high-content Ni-based cathode active material used as a high-capacity material, and to introduce a functional additive.

SUMMARY

Therefore, it is an aspect of the present invention to provide an electrolyte composition for a lithium secondary battery with improved lifetime characteristics, and a lithium secondary battery including the electrolyte composition.

Additional aspects of the invention will be set forth in part in the description which follows and, in part, will be obvious from the description, or may be learned by practice of the invention.

In an aspect, a lithium secondary battery may include: a cathode including a cathode active material; an anode including an anode active material; a separator disposed between the cathode and the anode; and an electrolyte.

The electrolyte may suitably include: a lithium salt; a solvent; and an additive including bis(trimethylsilyl) 2,2-thiodiacetate.

A content of bis(trimethylsilyl) 2,2-thiodiacetate may suitably be about 10 wt % or less (except for zero) with respect to the total weight of the electrolyte.

The content of bis(trimethylsilyl) 2,2-thiodiacetate may suitably be within a range of about 0.3 wt % to 1.5 wt % with respect to the total weight of the electrolyte.

The additive may further suitably include one or more of vinylene carbonate (VC), trimethyl (phenyl) silane, and fluoroethylene carbonate (FEC).

The content of trimethyl(phenyl)silane may suitably be about 10 wt % or less (except for zero) with respect to the total weight of the electrolyte.

The content of the trimethyl(phenyl)silane may suitably be within a range of about 0.5 wt % to 5 wt % with respect to the total weight of the electrolyte.

A content of each of the vinylene carbonate (VC) and the fluoroethylene carbonate (FEC) may suitably be within a range of about 0.5 wt % to 3 wt % with respect to the total weight of the electrolyte.

A total content of the additive may suitably be within a range of about 0.5 wt % to 3 wt % with respect to the total weight of the electrolyte.

The lithium salt may suitably include one or more compounds selected from the group consisting of $LiPF_6$, $LiBF_4$, $LiClO_4$, $LiCl$, $LiBr$, $LiI$, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $Li(SO_2F)_2N(LiFSI)$ and $(CF_3SO_2)_2NLi$.

The solvent may suitably include one or more compounds selected from the group consisting of ethylene carbonate (EC), ethyl methyl carbonate (EMC), diethyl carbonate (DEC), dimethyl carbonate (DMC), propylene carbonate (PC), dipropyl carbonate (DPC), butylene carbonate (BC), methyl propyl carbonate (MPC), and ethyl propyl carbonate (EPC).

The cathode active material may suitably include a lithium ternary (Ni—Mn—Co) cathode active material including nickel (Ni) in an amount of about 60 wt % to 99 wt % with respect to the total weight of the cathode active material.

The anode active material may suitably include a silicon-carbon composite.

The term "silicon-carbon composite" as used herein refers to a material including carbon and silicon as main components, for example, as carbon material servers as conductive structural component and silicon material (e.g., Si nanoparticles, silane, Si powders or $SiO_2$) is attached to, connected to, or disposed on the carbon material.

A content of silicon in the silicon-carbon composite may be about 5 wt % to 90 wt % with respect to the total weight of the anode active material.

Further provided is a vehicle that may include the lithium secondary batter as described herein.

Other aspects of the invention are disclosed infra.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
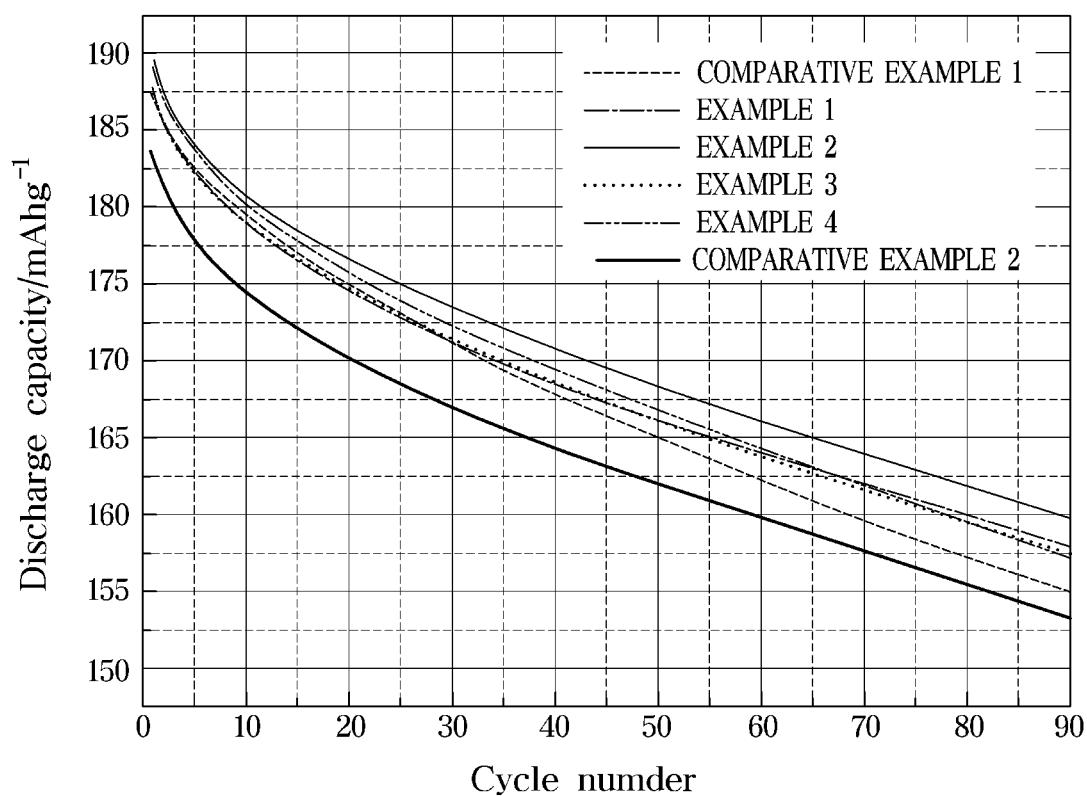
FIG. 1 is a graph showing lifetime characteristics of lithium secondary batteries including different kinds and contents of additives according to the number of charging/discharging cycles in Examples 1-4 and Comparative Examples 1-2.

Like reference numerals refer to like elements throughout this specification. This specification does not describe all components of embodiments, and general information in the technical field to which the present invention belongs or overlapping information between the embodiments will not be described.

Also, it will be understood that when the terms "includes," "comprises," "including," and/or "comprising," when used in this specification, specify the presence of a stated component, but do not preclude the presence or addition of one or more other components.

It is to be understood that the singular forms "a," "an," and "the" include plural referents unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, exemplary embodiments of the present invention will be described in detail with reference to the accompanying drawings and tables.

A lithium secondary battery to which an electrolyte for a lithium secondary battery according to an exemplary embodiment of the present invention is applied will be described, and then the electrolyte for the lithium secondary battery will be described in detail.

In general, a lithium secondary battery uses a lithium transition metal oxide (for example, $LiCoO_2$) as a cathode active material, a graphite material as an anode active material, and a carbonate organic solvent that is stable even at a relatively high voltage as an electrolyte functioning as a transfer path of lithium ions.

During charging, deintercalation of lithium ions occurs from a cathode active material which is a source of lithium ions so that the lithium ions move between layers of a carbon layered structure of an anode functioning as a storage of lithium ions. During discharging, the lithium ions return to a cathode from the anode to generate electricity. Accordingly, the performance of the battery depends on activation of the lithium ions of the cathode active material and whether the anode active material has sufficient space for intercalation of the lithium ions.

However, there are still problems that side reactions between the active materials and the electrolyte cause generation of gas and that, during charging/discharging, Mn and other metals are eluted to the electrolyte to be bound with other organic materials thereby increasing resistance, which prevents lithium cations from moving freely, resulting in deterioration of the output characteristics of the battery.

Particularly, precipitation of Mn is more serious during storage at high temperature. The eluted Mn precipitates on the surface of the anode active material, and receives electrons from the anode active material so that the electrolyte is decomposed from the anode active material by a reduction reaction to thereby increasing the resistance of the battery.

Generally, an electrolyte of a lithium secondary battery contacts electrodes to cause an oxidation-reduction reaction on the interfaces. Therefore, a material, such as LiF, $Li_2CO_3$, $LiO_2$, and LiOH, is generated to form a film on the surface of the anode. The film is called a solid electrolyte interface (SEI) film.

After a SEI film is formed upon initial charging, the SEI film may prevent a reaction between lithium ions and the anode or another material when charging/discharging is repeated by use of the battery, and may function as an ion tunnel that passes only lithium ions between the electrolyte and the anode.

In the currently used electrolytes for lithium secondary batteries, various side reactions occur due to repeated charging and discharging. By-products generated by such side reactions are becoming one of the factors that degrade the performance of the batteries. Particularly, when $LiPF_6$ lithium salt is contained in the electrolyte solution, it may cause dissolution of the electrode by destroying the SEI coating on the surface of the electrode, which may be a serious obstacle to battery operation.

Accordingly, various attempts have been made to develop an additive capable of forming an SEI film on the surface of an electrode.

In one aspect, provided is a lithium secondary battery including a cathode, an anode, a separator, and an electrolyte, wherein the electrolyte includes an electrolyte composition containing a lithium salt, a solvent, and an additive.

The cathode, the anode, and the separator constituting an electrode structure may be those generally used for manufacturing a lithium secondary battery.

The electrode includes an electrode active material and a binder. Specifically, the electrode may be formed by applying an electrode slurry obtained by mixing an electrode active material, a binder, a solvent, and a conductive material on a current collector of the electrode to a predetermined thickness, followed by drying and rolling.

The anode active material may suitably include any graphite-based material that may intercalate or deintercalate lithium ions, but is not limited to a specific graphite-based material. The anode active material may be made of any one or a combination of two or more materials selected from the group consisting of metallic materials alloyable with lithium and any mixtures thereof.

According to an exemplary embodiment, the anode active material may include silicon. The anode active material containing silicon, as used herein, is meant to include silicon oxide, silicon particles, and silicon alloy particles. Representative examples of the alloy include a solid solution of aluminum (Al), manganese (Mn), iron (Fe), titanium (Ti), etc., alloyed with silicon, an intermetallic compound, an eutectic alloy, etc., without being limited thereto.

In addition, the anode active material may suitably include a silicon-carbon composite (Si—C composite).

Examples of a carbon-based material include amorphous carbon and crystalline carbon such as natural graphite having a high degree of graphitization, artificial graphite, carbon black, meso carbon microbead (MCMB), and carbon fiber. Among them, graphite-based materials such as artificial graphite or natural graphite may be preferably used.

At this time, the content of silicon in the silicon-carbon composite may be about 5 to 90% by weight based on the total weight of the silicon-carbon composite. When the content of silicon is less than about 5% by weight, it is difficult to develop a high capacity battery, so that the mileage of the battery for a vehicle cannot be increased. On the other hand, when the content of silicon is greater than about 90% by weight, a running distance may be improved by implementing a high capacity of a vehicle battery, but lifetime characteristics of the battery may be deteriorated due to volume expansion of the silicon-carbon composite.

The cathode active material includes a compound that enables reversible intercalation and deintercalation of lithium. Particularly, the cathode active material may include at least one of composite oxides of lithium and a metal selected from cobalt, manganese, nickel, and any combinations thereof.

The electrolyte composition according to an exemplary embodiment may be more preferably used in a lithium secondary battery using a cathode including a Ni-rich cathode active material, and accordingly, the cathode may suitably include a lithium ternary (Ni—Mn—Co) cathode active material or a lithium nickel-manganese composite oxide.

The lithium ternary (Ni—Mn—Co) cathode active material may suitably include Ni as a main component. Ni may be an element of improving battery reversible capacity and a life characteristic, and the Ni content may be more than or equal to about 60 wt % and less than about 99% with respect to the total amount of the lithium ternary (Ni—Mn—Co) cathode active material.

As the binder, carboxymethyl cellulose (CMC)/styrene-butadiene rubber (SBR), which is an aqueous binder used for a graphite-based anode, may be used. When the anode contains graphite and a silicone composite, the binder may be a mixed binder in which carboxymethyl cellulose (CMC)/styrene-butadiene rubber (SBR) as a water-based binder used in a graphite-based anode is mixed with a polymer binder such as heparin, dopamine-polymerized heparin, and lithium polyacrylate (LiPAA) for increasing the adhesion strength of a silicon-based anode and suppressing the volume expansion of the silicon-based anode.

In addition to the electrode active material and the binder described above, the electrode according to exemplary embodiments may further include other components such as a dispersion medium, a conductive material, a viscosity modifier, and a filler as additives.

A separator is used for providing a path for lithium ion migration in the lithium secondary battery of the present invention and physically separating the two electrodes, and may be used without any particular limitation as long as it is commonly used as a separator in a lithium ion secondary battery. Particularly, it is preferable that the separator has low resistance to migration of ions of the electrolyte and excellent electrolyte-retaining ability.

For example, the separator may be formed by using a porous polymer film alone or stacking a plurality of porous polymer films, wherein the porous polymer film is made of a polyolefin polymer, such as an ethylene homopolymer, a propylene homopolymer, an ethylene/butane copolymer, an ethylene/hexane copolymer, and an ethylene/methacrylate copolymer. Also, the separator may be a ceramic coating, without being limited thereto.

Hereinafter, the electrolyte for the lithium secondary battery according to the embodiment will be described in more detail. In the following description, a unit of weight percent (wt %) will be used unless otherwise noted.

An electrolyte composition for a lithium secondary battery according to an exemplary embodiment of the present invention includes a lithium salt, a solvent, and bis (trimethylsilyl) 2,2-thiodiacetate as an additive.

Bis (trimethylsilyl) 2,2-thiodiacetate is an additive for forming a stable SEI film on the surface of an anode active material. When a content of bis (trimethylsilyl) 2,2-thiodiacetate is excessive, resistance of the anode may increase, thereby deteriorating the output. Therefore, according to the present invention, an upper limit of the bis (trimethylsilyl) 2,2-thiodiacetate content may be set to about 10.0 wt % with respect to the total weight of the electrolyte. Preferably, the content of bis (trimethylsilyl) 2,2-thiodiacetate may be within a range of about 0.3 wt % to 3.0 wt % with respect to the total weight of the electrolyte. More preferably, the content of bis (trimethylsilyl) 2,2-thiodiacetate may be within a range of about 0.3 wt % to 1.5 wt % with respect to the total weight of the electrolyte.

As the resistance result varies depending on the content of the anode SEI forming additive, which considerably affects an increase in initial resistance and a resistance of lifetime characteristics among various factors related to battery output, the electrolyte additives should be designed to have an optimum composition in proper amounts. Furthermore, a thick SEI film is a factor that degrades the rapid charging and rapid output, and an optimum composition for the material property is required.

The electrolyte composition for a lithium secondary battery according to exemplary embodiments may further include at least one of vinylene carbonate (VC), trimethyl (phenyl) silane, and fluoroethylene carbonate (FEC) as an additive.

Since trimethyl(phenyl)silane includes a silyl group, trimethyl(phenyl)silane may remove water from the electrolyte to suppress hydrolysis of the lithium salt. Also, although the lithium salt in the electrolyte is hydrolyzed to produce an acid material (for example, HF), the acid material may be selectively removed by a neutralization reaction of an oxidation product of trimethyl(phenyl)silane and the acid material. Furthermore, by adding trimethyl(phenyl)silane, a stable SEI film may be formed on the surface of the cathode.

As described above, trimethyl (phenyl) silane is an additive that inhibits elution of the transition metal, which is a cathode active material. However, an excessive trimethyl (phenyl)silane content may increase cell costs, and have a negative influence on energy density per weight. Accordingly, a maximum trimethyl(phenyl)silane content may be limited to about 10.0 wt % with respect to the total weight of the electrolyte. Preferably, the trimethyl(phenyl)silane content may be within a range of about 0.5 wt % to 5.0 wt % with respect to the total weight of the electrolyte. More preferably, the trimethyl(phenyl)silane content may be within a range of about 0.5 wt % to 1.5 wt % with respect to the total weight of the electrolyte.

An electrolyte composition for a lithium secondary battery according to another aspect of the present invention may further include vinylene carbonate (VC) together with trimethyl(phenyl)silane, as an additive.

Since vinylene carbonate (VC) having a vinyl structure and a ring strain in a pentagonal structure has a lower lowest unoccupied molecular orbital (LUMO) energy than that of an organic solvent used in an electrolyte, vinylene carbonate (VC) has relatively high reductive degradation tendency so as to form a stable SEI film on the surface of the anode.

When vinylene carbonate (VC) and trimethyl(phenyl) silane are added together, vinylene carbonate (VC) may prevent an electrolyte decomposition reaction. Also, although an electrolyte decomposition reaction occurs, the trimethyl(phenyl)silane may effectively remove an acid material (for example, HF) which is the decomposition product, thereby compensating for water vulnerability.

In addition, the electrolyte composition for a lithium secondary battery according to another aspect of the present invention may further include fluoro ethylene carbonate (FEC) together with trimethyl (phenyl) silane as an additive.

Like VC, FEC has a lower LUMO energy (EC: −0.3310 eV, VC: −0.8819 eV, FEC: −0.8444 eV, DFT calculation) than that of ethylene carbonate (EC), which is mainly used as a co-solvent. As a result, reduction decomposition tendency of FEC is relatively high. Therefore, when the lithium secondary battery is driven, FEC is reduced before the solvent to form the SEI film on the surface of the anode.

The content of each of the vinylene carbonate (VC) and the fluoroethylene carbonate (FEC) may be about 0.5 to 3 wt % by weight based on the total electrolyte composition. When the content of each of VC and FEC is less than about 0.5 wt %, the SEI film may not be formed sufficiently on the surface of the anode. When the content of each of VC and FEC is greater than about 3.0 wt %, the ion conductivity may be decreased.

Meanwhile, a content of an additive in which bis(trimethylsilyl) 2,2-thiodiacetate is mixed together with vinylene carbonate (VC) and trimethyl(phenyl)silane may be about 10 wt % or less (except for zero). Preferably, the additive content may be within a range of about 0.5 wt % to 3.0 wt % with respect to the total weight of the electrolyte.

The LUMO energies of ethylene carbonate (EC), ethylmethyl carbonate (EMC), dimethyl carbonate (DMC), and diethyl carbonate (DEC), which are carbonate solvents, are −0.3310 eV, 0.0435 eV, 0.0479 eV, 0.0454 eV, respectively. Since the reducing decomposition tendencies of the vinylene carbonate (VC) and fluoroethylene carbonate (FEC) additives of the present invention are greater than that of the carbonate-based solvent, the additive may be reduced and decomposed earlier than the solvent during the operation of the battery to form the SEI film on the surface of the anode.

Meanwhile, the solvent may suitably include one or more materials selected from the group consisting of ethylene carbonate (EC), diethyl carbonate (DEC), dimethyl carbonate (DMC), propylene carbonate (PC), dipropyl carbonate (DPC), butylene carbonate (BC), methyl propyl carbonate (MPC), ethyl propyl carbonate (EPC), and ethyl methyl carbonate (EMC).

According to one embodiment of the present invention, it is preferable to use a carbonate-based solvent (EC, EMC, DEC, or DMC) together with the additive of the present invention as solvents to stabilize the electrode interface and the electrolyte bulk.

The lithium salt may suitably include one or more materials selected from the group consisting of $LiPF_6$, $LiBF_4$, $LiClO_4$, $LiCl$, $LiBr$, $LiI$, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $Li(SO_2F)_2N(LiFSI)$ and $(CF_3SO_2)_2NLi$.

Example

Hereinafter, lifetime characteristics of an electrolyte composition for a lithium secondary battery according to an embodiment of the present invention will be described through examples and comparative examples. However, the following examples are provided only to help understanding of the present invention, and the scope of the present invention is not limited thereto.

In order to perform tests for evaluating the lifetime characteristics, electrolyte compositions for lithium secondary batteries were prepared according to examples and comparative examples in accordance with the following composition ratios. Additive contents of ion conductivity of electrolytes of the respective examples and comparative examples are shown in Table 1 below.

Examples 1 to 4 and Comparative Examples 1 to 2

A mixed solution of ethylene carbonate (EC), diethyl carbonate (DEC), and ethyl methyl carbonate (EMC) mixed at a volume ratio of 25:30:45 was mixed with 0.5 M $LiPF_6$ and 0.5 M LiFSI as lithium salts, and then additives listed in the following Table 1 were added thereto in amounts based on the total weight of each electrolytic solution to prepare electrolytic solutions.

95 wt % of carbon powder as an anode active material, 3 wt % of styrene-butadiene rubber (SBR)/carboxymethyl cellulose (CMC) as a binder, and 2 wt % of Super-P of as a conductive material were added to $H_2O$ to manufacture an anode mixture slurry. The anode mixture slurry was coated on both surfaces of a copper foil, and the resultant copper foil was dried and compressed to manufacture an anode.

$Li(Ni_{0.6}Co_{0.2}Mn_{0.2})O_2$ as a cathode active material, polyvinylidene fluoride (PVdF) as a binder, and carbon as a conductive material were mixed at a weight ratio of 93:4:3, and dispersed in N-methyl-2-pyrrolidone to manufacture a cathode slurry. The cathode slurry was coated on an aluminum foil, and the resultant aluminum foil was dried and compressed to manufacture a cathode. A ceramic-coated polyolefin separation film was interposed between the anode and the cathode to form an electrode assembly, and then the manufactured electrolytic solution was injected thereinto to manufacture a pouch type lithium secondary battery.

Examples 5 to 10

Examples 5 to 10 are performed in the same manner as in Examples 1 to 4 except that vinylene carbonate (VC) was used as an additive and at least one of bis (trimethylsilyl) 2,2-thiodiacetate and trimethyl (phenyl) silane was used as an additive.

TABLE 1

| | Additive | | | Electrolyte |
|---|---|---|---|---|
| | VC | Bis(trimethylsilyl) 2,2-thiodiacetate | Trimethyl(phenyl)silane | Ion Conductivity (mS/cm) |
| Comparative Example 1 | 2 | | | 8.25 |
| Example 1 | | 0.2 | | 8.28 |

TABLE 1-continued

| | Additive | | | Electrolyte |
|---|---|---|---|---|
| | VC | Bis(trimethyl-silyl) 2,2-thio-diacetate | Trimethyl(phe-nyl)silane | Ion Conductivity (mS/cm) |
| Example 2 | | 0.5 | | 8.27 |
| Example 3 | | 1.0 | | 8.12 |
| Example 4 | | 1.5 | | 8.01 |
| Comparative Example 2 | | 2.0 | | 7.88 |
| Example 5 | 1 | 1.0 | | 8.05 |
| Example 6 | 1 | 0.5 | | 8.12 |
| Example 7 | 0.5 | 1.0 | | 8.07 |
| Example 8 | 0.5 | 0.5 | | 8.15 |
| Example 9 | 0.5 | 1.0 | 0.5 | 8.10 |
| Example 10 | 0.5 | 0.5 | 0.5 | 8.14 |

(unit: weight %)

Figure 2:
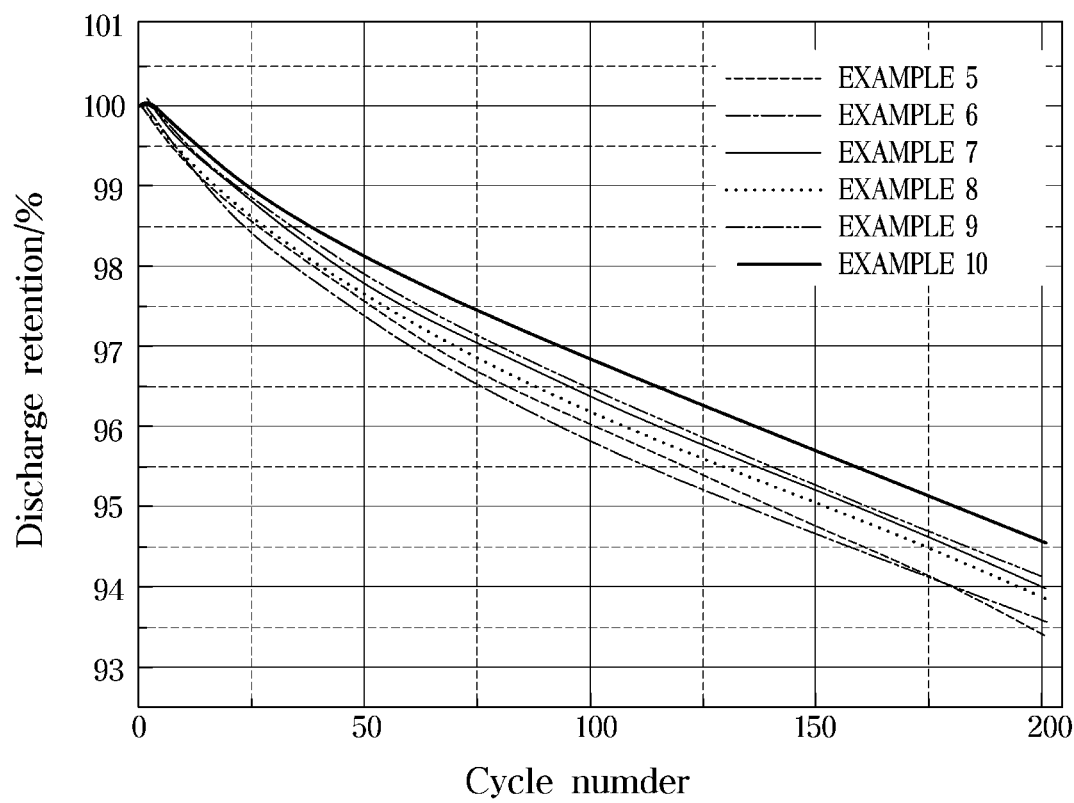
FIG. 2 is a graph showing lifetime characteristics of lithium secondary batteries including different kinds and contents of additives according to the number of charging/discharging cycles in Examples 5-10.

Lifetime characteristics of lithium secondary batteries manufactured under conditions of Table 1 were evaluated at a charging/discharging rate of 0.5 C at a temperature of 45° C. and a voltage of 2.5 to 4.2 V, and the evaluation results are shown in FIGS. 1 to 2.

Here, a discharge rate when the battery is completely discharged in one hour is defined as 1 C (C-rate) discharge. That is, 2C means completely discharging the capacity in 30 minutes and C/5 means completely discharging in 5 hours.

Capacity retention ratio related to the lifetime characteristics was calculated as follows.

Capacity retention ratio at $100^{th}$ cycle=discharge capacity at $100^{th}$ cycle/discharge capacity at first cycle FIG. 1 is a graph showing discharge capacities of lithium secondary batteries according to the number of cycles at a temperature of 45° C. The lower the slope of the discharge capacity of each of the examples and comparative example shown in FIG. 1, the smaller the change in discharge capacity according to the number of charge/discharge cycles indicating the better the lifetime characteristics. In FIG. 1, the abscissa axis represents the number of cycles and the ordinate axis represents the discharge capacity (mAh/g).

As shown in FIG. 1, compared with the lithium secondary battery according to Comparative Example 1, the lithium secondary batteries of Examples 1 to 4 maintained a capacity of 80% or greater of the initial capacity even after 90 cycles, confirming that the discharge capacity retention ratio was relatively excellent.

On the other hand, in the case of Comparative Example 2, the content of bis (trimethylsilyl) 2,2-thiodiacetate was greater than the predetermined amount and at 2.0 wt %, and the resistance of the anode was increased, so that the discharge capacity could not be secured.

Also, referring to Table 1, although Examples 1 to 4 further contain bis (trimethylsilyl) 2,2-thiodiacetate as an additive, there is almost no difference of ion conductivity when compared to Comparative Example 1 which does not include the additive. It can be seen that the output characteristics of the battery were not deteriorated by the additive.

FIG. 2 is a graph showing the measurement results of lifetime characteristics of lithium secondary batteries according to Examples 5 to 10 for 200 cycles at a temperature of 45° C.

As shown in FIG. 2, the lithium secondary batteries of Examples 5 to 10 maintained a discharge capacity greater than 93% of the initial capacity even after 200 cycles.

In particular, since the capacity retention ratios of Examples 5 to 10 added with VC are greater than those of Examples 1 to 4 including bis (trimethylsilyl) 2,2-thiodiacetate alone, it may be confirmed that lifetime characteristics of the lithium secondary batteries were further be improved by including both of VC and bis (trimethylsilyl) 2,2-thiodiacetate lifetime characteristics.

Thereafter, lifetime characteristics of lithium secondary batteries when fluoroethylene carbonate (FEC) was further added will be described.

Examples 11 to 19 and Comparative Examples 3

Examples 11 to 19 and Comparative Examples 3 were performed in the same manner as in Examples 1 to 4 except that any one of VC, trimethyl(phenyl)silane and fluoroethylene carbonate (FEC) was used as an electrolyte additive, together with bis(trimethylsilyl) 2,2-thiodiacetate.

Figure 3:
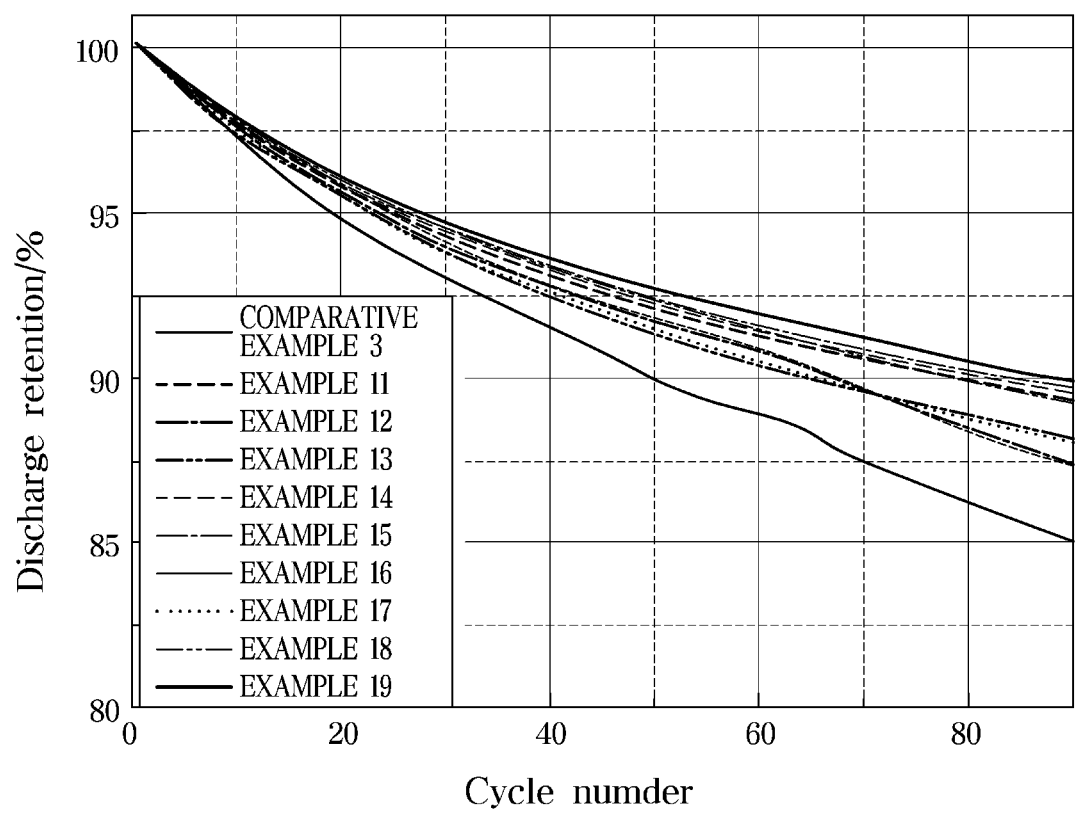
FIG. 3 is a graph showing lifetime characteristics of lithium secondary batteries including different kinds and contents of additives according to the number of charging/discharging cycles in Examples 11-19 and Comparative Example 3.

Lifetime characteristics of the lithium secondary batteries manufactured under the conditions shown in Table 2 were evaluated, and the evaluation results are shown in FIG. 3.

TABLE 2

| | Additive | | | | Electrolyte |
|---|---|---|---|---|---|
| | VC | FEC | Bis(trimethyl-silyl) 2,2-thio-diacetate | Trimethyl(phe-nyl)silane | Ion Conductivity (mS/cm) |
| Comparative Example 3 | 2 | 2 | | | 7.89 |
| Example 11 | 2 | | 1 | | 8.01 |
| Example 12 | 1 | | 1 | | 8.07 |
| Example 13 | | 2 | 1 | | 8.03 |
| Example 14 | | 1 | 1 | | 8.11 |
| Example 15 | 1 | 1 | 1 | | 7.98 |
| Example 16 | 1 | 1 | 0.5 | | 8.02 |
| Example 17 | 1 | 1 | 0.5 | 0.5 | 8.01 |
| Example 18 | 1 | 0.5 | 0.5 | 0.5 | 8.07 |
| Example 19 | 0.5 | 0.5 | 0.5 | 0.5 | 8.11 |

FIG. 3 is a graph showing discharge capacities of lithium secondary batteries according to the number of cycles at a temperature of 45° C.

As shown in FIG. 3, compared with the lithium secondary battery according to Comparative Example 3 to which bis (trimethylsilyl) 2,2-thiodiacetate was not added, each of the lithium secondary batteries of Examples 11 to 19 maintained a capacity of 87% or greater of the initial capacity even after 90 cycles, confirming that the discharge capacity retention ratio was relatively excellent.

In conclusion, it is confirmed that when bis(trimethylsilyl) 2,2-thiodiacetate is used together with VC or FEC, cell output characteristics are not deteriorated because there is no difference in ionic conductivity while decreasing the content of VC or FEC which is a commonly used additive. In particular, it can be confirmed from Examples 17 to 19 that addition of trimethyl (phenyl) silane further improves lifetime characteristics.

On the other hand, in the case of Comparative Example 3 in which the total content of the additive is 4% as shown in Table 2 and FIG. 3, the output and lifetime characteristics are deteriorated. Even in the case of Examples 17 to 19 in which the contents of bis (trimethylsilyl) 2,2-thiodiacetate and trimethyl (phenyl) silane are the same, the output and lifetime characteristics are deteriorated as the total additive content is increased. Accordingly, it can be confirmed that the content of the additive is preferably 0.5 to 3.0%, more preferably 1 to 2.5%, based on the total electrolyte composition.

Referring to Examples 1 to 19, the additive according to the exemplary embodiments may be prepared by adding bis (trimethylsilyl) 2,2-thiodiacetate alone or by combining bis(trimethylsilyl) 2,2-thiodiacetate with vinylene carbonate (VC), trimethyl (phenyl) silane and fluoroethylene carbonate (FEC).

In conclusion, the electrolyte composition according to exemplary embodiments may improve the lifetime characteristics of the lithium secondary battery by complementing for vulnerability to water while reducing the VC content. Accordingly, the lithium secondary battery including the electrolyte according to exemplary embodiments may be applied to medium- and large-size lithium secondary battery for vehicle requiring a high output and a long lifetime.

The electrolyte for the lithium secondary battery according to various exemplary embodiments of the present invention may include, as an additive, bis(trimethylsilyl) 2,2-thiodiacetate forming a film on the anode active material to increase lifetime while reducing the VC content, thereby improving the lifetime of the lithium secondary battery. Therefore, the electrolyte for the lithium secondary battery may be effectively applied to medium- and large-size battery.

Also, by using, as an additive, trimethyl(phenyl)silane capable of suppressing the generation of HF deteriorating the lifetime of the cathode active material made of Ni, Co, and Mn to compensate for vulnerability to water, the electrolyte may improve the lifetime of the lithium secondary battery.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A lithium secondary battery comprising:
   a cathode comprising a cathode active material;
   an anode comprising an anode active material;
   a separator disposed between the cathode and the anode; and
   an electrolyte,
   wherein the electrolyte comprises:
   a lithium salt;
   a solvent; and
   an additive comprising bis(trimethylsilyl) 2,2-thiodiacetate.

2. The lithium secondary battery according to claim 1, wherein a content of the bis(trimethylsilyl) 2,2-thiodiacetate is about 10 wt % or less (except for zero) with respect to the total weight of the electrolyte.

3. The lithium secondary battery according to claim 1, wherein the content of the bis(trimethylsilyl) 2,2-thiodiacetate is within a range of about 0.3 wt % to 1.5 wt % with respect to the total weight of the electrolyte.

4. The lithium secondary battery according to claim 1, wherein the additive further comprises one or more of vinylene carbonate (VC), trimethyl (phenyl) silane, and fluoroethylene carbonate (FEC).

5. The lithium secondary battery according to claim 4, wherein a content of the trimethyl(phenyl)silane is about 10 wt % or less (except for zero) with respect to the total weight of the electrolyte.

6. The lithium secondary battery according to claim 4, wherein the content of the trimethyl(phenyl)silane is within a range of about 0.5 wt % to 5 wt % with respect to the total weight of the electrolyte.

7. The lithium secondary battery according to claim 4, wherein a content of each of the vinylene carbonate (VC) and the fluoroethylene carbonate (FEC) is within a range of about 0.5 wt % to 3 wt % with respect to the electrolyte.

8. The lithium secondary battery according to claim 4, wherein a total content of the additive is within a range of about 0.5 wt % to 3.0 wt % with respect to the total weight of the electrolyte.

9. The lithium secondary battery according to claim 1, wherein the lithium salt comprises one or more compounds selected from the group consisting of $LiPF_6$, $LiBF_4$, $LiClO_4$, LiCl, LiBr, LiI, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiB(C_6H_5)_4$, $Li(SO_2F)_2N(LiFSI)$ and $(CF_3SO_2)_2NLi$.

10. The lithium secondary battery according to claim 1, wherein the solvent comprises one or more compounds selected from the group consisting of ethylene carbonate (EC), ethyl methyl carbonate (EMC), diethyl carbonate (DEC), dimethyl carbonate (DMC), propylene carbonate (PC), dipropyl carbonate (DPC), butylene carbonate (BC), methyl propyl carbonate (MPC), and ethyl propyl carbonate (EPC).

11. The lithium secondary battery according to claim 1, wherein the cathode active material comprises a lithium ternary (Ni—Mn—Co) cathode active material comprising nickel (Ni) in an amount of about 60 wt % to 99 wt % with respect to the total weight of the cathode active material.

12. The lithium secondary battery according to claim 1, wherein the anode active material comprises a silicon-carbon composite.

13. The lithium secondary battery according to claim 12, wherein the content of silicon in the silicon-carbon composite is about 5 wt % to 90 wt % with respect to the total weight of the anode active material.

14. A vehicle comprising a lithium secondary battery according to claim 1.

* * * * *